United States Patent [19]
Randolph, Jr.

[11] 3,961,238
[45] June 1, 1976

[54] SELECTIVE METAL DETECTOR CIRCUIT HAVING DUAL TUNED RESONANT CIRCUITS

[75] Inventor: Byron B. Randolph, Jr., Phoenix, Ariz.

[73] Assignee: Robert F. Gardiner, Phoenix, Ariz.

[22] Filed: Jan. 22, 1975

[21] Appl. No.: 542,961

[52] U.S. Cl. .................................................. 324/3
[51] Int. Cl.² ........................................ G01V 3/08
[58] Field of Search ............. 324/3, 41, 67; 331/65, 331/117; 340/258 C

[56] References Cited
UNITED STATES PATENTS

| | | | |
|---|---|---|---|
| 2,972,116 | 2/1961 | Lowe | 331/117 |
| 3,013,256 | 12/1961 | Damast | 340/258 C UX |
| 3,015,077 | 12/1961 | Elam et al. | 331/65 |
| 3,201,774 | 8/1965 | Uemura | 324/3 X |
| 3,284,724 | 11/1966 | Marlow | 331/117 X |
| 3,355,658 | 11/1967 | Gardiner | 324/3 |
| 3,422,415 | 1/1969 | Ichimori | 331/117 X |
| 3,453,532 | 7/1969 | Gardiner | 324/3 |
| 3,503,007 | 3/1970 | Kutschbach | 324/41 X |
| 3,742,341 | 6/1973 | Clowes | 324/3 |
| 3,747,012 | 7/1973 | Buck | 324/3 X |

Primary Examiner—Gerard R. Strecker
Attorney, Agent, or Firm—Cahill, Sutton & Thomas

[57] ABSTRACT

A metal detector circuit is described utilizing a search coil inductively coupled to a parallel resonant circuit. This circuit replaces the tapped parallel resonant circuit of a Hartley oscillator. Feedback to sustain oscillation is provided by a series resonant circuit driven by the parallel resonant circuit, with the series resonant circuit having a higher resonant frequency than the parallel resonant circuit.

3 Claims, 2 Drawing Figures

SELECTIVE METAL DETECTOR CIRCUIT HAVING DUAL TUNED RESONANT CIRCUITS

The present invention pertains to metal detectors, and more particularly to metal detectors of the type that may be utilized to detect and distinguish metal objects found near the surface of the earth.

Numerous metal detectors are available, each utilizing a search coil to locate metal objects beneath the surface of the ground. In one design, (see, for example, U.S. Pat. No. 3,601,691 — Gardiner), the search coil is driven by an oscillator, so that metal objects in proximity to the search coil affect the operation of the oscillator. Changes in the amplitude of oscillation are used as a basis for deriving an indication to the operator that a metallic object is present in the vicinity of the search coil.

The affect of the metal object on the search coil will vary depending on the size, shape and type of metal being detected. Typically, ferrous metals having ferromagnetic properties will increase the apparent inductance of the search coil and result in an increase in the Q of the resonant tank. Assuming a properly designed oscillator, the increase in Q will result in an increase of the amplitude of oscillations. Non-ferrous metals, such as coins, will result in the lowering of the Q of the tank circuit and a lowering of the amplitude of oscillation.

A significant difficulty is presented to the operator when it is not only desired to distinguish between ferrous and non-ferrous metal objects but also to distinguish between certain types of non-ferrous metal objects. It has been found that certain thin metal non-ferrous objects, such as aluminum pull tabs, will present the same decrease in amplitude of oscillation as a thick metal non-ferrous objects. Obviously, it is desirable to be able to distinguish not only between ferrous and non-ferrous objects, but also between worthless objects, such as aluminum foil and thin metal aluminum pull tabs, and the more valuable thicker non-ferrous objects, such as coins and bars.

It is therefore an object of the present invention to provide a metal detector for detecting objects beneath the surface of the ground.

It is another object of the present invention to provide a metal detector for detecting metallic objects and distinguishing between ferrous and non-ferrous metallic objects.

It is still another object of the present invention to provide a metal detector for detecting metallic objects beneath the surface of the ground and distinguishing between generally valuable and generally non-valuable non-ferrous metallic objects as well as between ferrous and non-ferrous metallic objects.

These and other objects of the present invention will become more apparent to those skilled in the art as the description thereof proceeds.

The present invention may more readily be described by reference to the accompanying drawings in which.

Figures 1, 2:
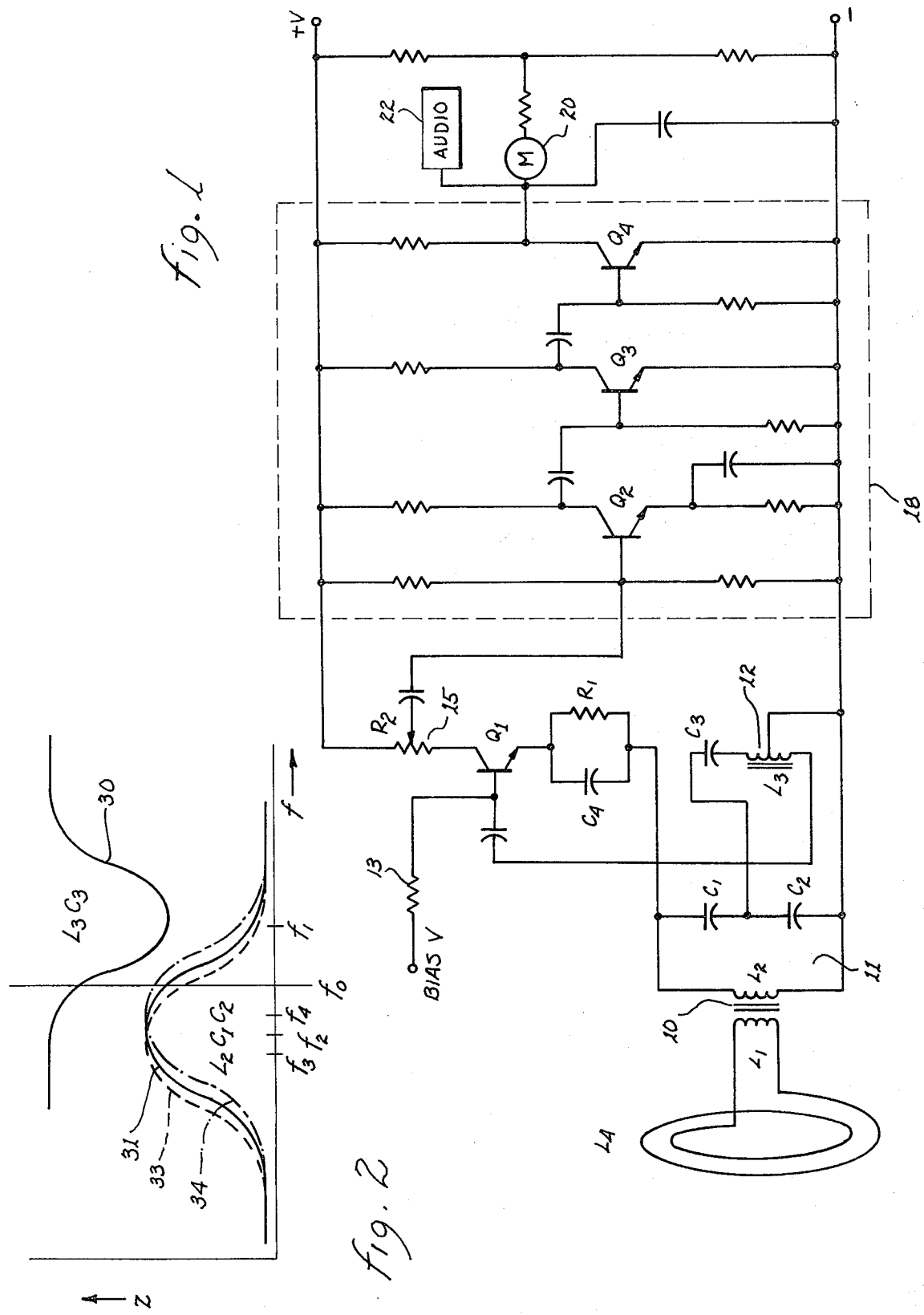
FIG. 1 is a schematic circuit diagram of a metal detector incorporating the teachings of the present invention.
FIG. 2 is a diagram of frequency/impedance characteristics useful in the description of the present invention.

Referring now to FIG. 1, a search coil $L_4$ is inductively coupled to a parallel tank circuit 11 through the expediency of a transformer 10 having a primary coil $L_2$ and a secondary coil $L_1$. The tank circuit 11 includes the series combination of capacitors $C_1$ and $C_2$ being connected in parallel with the inductance $L_2$. The tank circuit 11 forms the basis of an oscillator with transistor $Q_1$ and having resistor $R_1$ and capacitor $C_4$ providing self biasing for the transistor. An inductor $L_3$ is connected to one side of capacitor $C_3$ to form a series resonant circuit with the other side of $C_3$ being connected to the junction of $C_1$ and $C_2$. Inductor $L_3$ is connected to one side of the parallel circuit 11 by tap 12 so that the series resonant circuit is driven by the parallel resonant circuit. The end of inductor $L_3$ opposite that connected to capacitor $C_3$ provides feedback in the proper phase, and is capacitively coupled to the base of transistor $Q_1$.

An appropriate biasing voltage may be applied through a resistor 13 to the base of the transistor $Q_1$; the series resonant circuit $L_3 C_3$ is adjusted to a resonant frequency higher than the resonant frequency of the parallel resonant circuit $L_2C_1C_2$. A resistance $R_2$ is connected to the collector of the transistor $Q_1$ and an output signal is derived therefrom through the utilization of a wiper contact 15 capacitively coupled to succeeding stages.

The output signal derived from the oscillator is delivered through the wiper 15, as previously stated, and is amplified in a suitable multistage amplifier 18. The amplified signal may be applied to a meter such as that shown at 20 for the derivation of an appropriate indication of the amplitude of the amplified signal. In addition thereto, or alternatively, the signal may be applied to a suitable audio circuit 22 to generate an audio signal whose amplitude or whose frequency will represent the amplitude of the amplified signal. Suitable biasing voltages are applied to the circuit in a conventional and well known manner.

The operation of the circuit of FIG. 1 may more readily be described by first referring to FIG. 2 wherein the characteristic curves of the parallel resonant circuit $L_2C_1C_2$ and the series resonant circuit $L_3C_3$ are shown. It is well known that the impedance of a series resonant circuit is a minimum at the resonant frequency; accordingly, the characteristic curve 30 illustrates a minimum impedance for the series resonant circuit $L_3C_3$ at a frequency $f_1$. Similarly it is well known that the impedance of a parallel resonant circuit is a maximum at the resonant frequency; accordingly, the characteristic curve 31 of the parallel resonant circuit $L_2C_1C_2$ indicates a maximum impedance at a frequency $f_2$. The operating frequency of the circuit of FIG. 1 will be somewhere between the two resonant frequencies of the resonant circuits (shown as $f_0$).

Since the impedance of the parallel resonant circuit is maximum at resonance, it will permit maximum amplitude of oscillation; the impedance of the series circuit is minimum at resonance but the voltage across the inductor $L_3$ is maximum at resonance. Therefore, since the voltage provided for feedback to sustain oscillation is derived from the inductor $L_3$, maximum amplitude of oscillation will tend to be premitted at the series resonance frequency. In other words, although the impedance of the series resonant circuit decreases at the series resonant frequency, the feedback voltage derived from the series resonant circuit increases.

When the resonant frequencies of the two circuits are adjusted so that the resonant frequency of the series circuit is slightly higher than that of the parallel circuit, the oscillating circuit of FIG. 1 will reach an operating frequency somewhere between the two resonant frequencies.

The search coil $L_4$ is driven by the parallel resonant circuit 11 and the inductance thereof is effectively reflected into the parallel circuit. Therefore, a change in the inductance of the search coil as a result of the detection of an inductive metal object will change the inductance of the parallel resonant circuit. Such inductive material in the proximity of the search coil will increase the inductance of the search coil and, therefore, the inductance of the parallel tuned circuit 11.

Returning now to the operation of the circuit of FIG. 1, when a ferrous metallic object is placed in the vicinity of the search coil, the increased density of the magnetic flux resulting from the ferromagnetic object increases the inductance of the coil. This increased inductance in the parallel resonant circuit decreases the resonant frequency of the circuit (see characteristic curve 33 in FIG. 2) and moves this resonant frequency (now frequency $f_3$) further from the otherwise normal operating frequency so that the impedance of the parallel resonant circuit will decrease, and the amplitude of oscillation will decrease.

When thin metal objects such as aluminum pull tabs are placed in the field of the search coil, power consuming eddycurrents are generated therein by the fluctuation of the field and the Q of the circuit will thus be lowered. The decrease in the Q will cause a corresponding decrease in the amplitude of the oscillations. Thus far, it may be seen that the circuit behaves in a similar manner for ferrous objects as well as thin metal non-ferrous objects.

However, when a non-ferrous thick metal object is brought within the field of the search coil, the object appears as a single turn winding, driven by the search coil, to reduce the inductance of the search coil and therefore reduce the inductance of the parallel resonant circuit driving the search coil. The initial effect of this reduced inductance would normally be to reduce the Q of the circuit with a resultant reduction in the amplitude of oscillation; however, as the reduced inductance increases the resonant frequency of the parallel resonant circuit, (see characteristic curve 34 in FIG. 2) it moves this frequency (now $f_4$) closer to the quiescent operating frequency of the circuit. Since in a parallel resonant circuit the impedance is at a maximum when the circuit approaches resonance, the amplitude of oscillation will increase.

The above explanation of operation is predicated upon the objects being simply ferromagnetic, or non-ferromagnetic; however, when the circuit is used in actual practice, the objects frequently will be partly ferromagnetic and partly non-ferromagnetic or paramagnetic and the action of the circuit becomes more complicated. The following component values, when placed in the circuit of FIG. 1, have been found to operate satisfactorily and permit the detection of and the differentiation between ferromagnetic, valueless non-ferromagnetic (such as aluminum pull tabs) and more valuable non-ferromagnetic objects such as gold and like-metal devices:

Coupling Transformer 10, and $L_1$, $L_2$: primary winding, 30 turns of No. 28 magnet wire; secondary, two turns of No. 14 stranded insulated wire; both wound on a common bobbin and mounted within a 30 × 19 millimeter cup core $L_3$: 120 turns of No. 28 magnet wire, tapped at 40 turns, wound on a bobbin and mounted within a 30 × 19 millimeter cup core $L_4$: five turns No. 14 magnet wire wound in a flat helix of 10 inches outside diameter with a 4 inches center hole and mounted between two ⅛ inch plywood disks $C_1$: 0.181 microfarads $C_2$: 0.702 microfarads $C_3$: 0.012 microfarads Utilizing the above component values, the circuit has been found to operate at 15.581 kilohertz and will be found to detect and distinguish between such metal objects as coins, rings of valuable metals, bottle caps, nails, aluminum pull tabs, etc. Of course, the particular metal or alloy of metal with which the object is made as well as the orientation of the object may adversely affect the indication otherwise derived. Nevertheless, it has been found that the circuit of the present invention provides a relatively inexpensive and reliable means for detecting metal objects on or beneath the surface of the ground as well as a means for distinguishing between generally valuable and generally non-valuable objects.

I claim:

1. In a metal detector of the type to be passed over the ground to detect metallic objects near the surface of the ground, the combination comprising:
  a. a search coil;
  b. a transistor oscillator for driving said search coil and having a parallel resonant tank circuit and a series resonant feedback circuit, each tuned to a different frequency;
  c. said parallel resonant tank circuit including an inductor inductively coupled to said search coil and including a pair of series connected capacitors connected in parallel with said inductor;
  d. a transistor having an emitter, collector and a base;
  e. means connecting said parallel tank circuit to said emitter;
  f. means connecting said series resonant feedback circuit between the junction of said capacitors and said base;
  g. amplifying means, means connecting said amplifying means to said collector; and
  h. indicator means connected to said amplifying means for receiving the amplified signal therefrom and presenting an indication of the amplitude thereof to an operator.

2. The combination set forth in claim 1 wherein the resonant frequency of said parallel resonant tank circuit is lower than the resonant frequency of said resonant feedback circuit.

3. The apparatus set forth in claim 1 wherein said series resonant feedback circuit includes a capacitor connected in series with an inductance having a tap at a predetermined position along its length, and including means connecting said tap to said parallel resonant tank circuit.

* * * * *